US010302803B2

(12) United States Patent
Celepcikay et al.

(10) Patent No.: US 10,302,803 B2
(45) Date of Patent: May 28, 2019

(54) MEASUREMENT CORRECTION APPARATUS, METHODS, AND SYSTEMS

(71) Applicant: Halliburton Energy Services, Inc., Houston, TX (US)

(72) Inventors: Ferhat Turker Celepcikay, Houston, TX (US); Burkay Donderici, Houston, TX (US); Luis Emilio San Martin, Houston, TX (US); Junsheng Hou, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/384,290

(22) PCT Filed: Dec. 31, 2012

(86) PCT No.: PCT/US2012/072311
§ 371 (c)(1),
(2) Date: Sep. 10, 2014

(87) PCT Pub. No.: WO2014/105083
PCT Pub. Date: Jul. 3, 2014

(65) Prior Publication Data
US 2015/0039231 A1 Feb. 5, 2015

(51) Int. Cl.
*G01V 3/38* (2006.01)
*G01V 1/48* (2006.01)
(Continued)

(52) U.S. Cl.
CPC .............. *G01V 3/38* (2013.01); *G01V 1/48* (2013.01); *G01V 3/20* (2013.01); *G01V 99/00* (2013.01); *G01V 3/02* (2013.01)

(58) Field of Classification Search
CPC ... G01V 3/38; G01V 1/48; G01V 3/02; G01V 3/20; G01V 99/00
See application file for complete search history.

(56) References Cited

U.S. PATENT DOCUMENTS 5,666,057 A    9/1997  Beard et al.
6,677,756 B2 * 1/2004  Fanini ................ G01V 3/28
                                                      324/339
(Continued)

FOREIGN PATENT DOCUMENTS

WO    WO-2014105083 A1    7/2014

OTHER PUBLICATIONS

Richardson, Geosciences 567: Chapter 1, Jun. 2010. [retrieved on Feb. 22, 2016]. Retrieved from the Internet< URL: https://web.archive.org/web/20100630084949/http://www.geo.arizona.edu/geo5xx/geos567/classnotes/ch1-fall09.pdf>.*

(Continued)

Primary Examiner — Janet L Suglo
Assistant Examiner — Liam R Casey
(74) Attorney, Agent, or Firm — Gilliam IP PLLC

(57) ABSTRACT

In some embodiments, an apparatus and a system, as well as a method and an article, may operate to calculate a map that transforms fast modeled measurement results into accurate modeled measurement results within a modeled data space, to make actual measurements using a tool disposed in a borehole, to transform a plurality of modeling parameter vectors into the fast modeled measurement results via modeling, to transform the fast modeled measurement results into the accurate modeled measurement results using the map, to locate a matching modeling parameter vector as one of the plurality of modeling parameter vectors that matches the accurate modeled measurement results to the actual measurement, and to display at least a portion of the matching modeling parameter vector to represent at least one property of a geological formation. Additional apparatus, systems, and methods are described.

24 Claims, 11 Drawing Sheets

(51) Int. Cl.
*G01V 3/02* (2006.01)
*G01V 99/00* (2009.01)
*G01V 3/20* (2006.01)

(56) References Cited

U.S. PATENT DOCUMENTS

| | | | |
|---|---|---|---|
| 7,313,479 B2 | 12/2007 | Frenkel | |
| 2003/0028325 A1* | 2/2003 | Roggero et al. | 702/11 |
| 2003/0105591 A1* | 6/2003 | Hagiwara | G01V 3/28 702/7 |
| 2005/0143921 A1* | 6/2005 | Winbow | G01V 99/00 702/14 |
| 2005/0278122 A1* | 12/2005 | Tabarovsky | G01V 3/28 702/9 |
| 2006/0015306 A1* | 1/2006 | Chow | G05B 17/02 703/2 |
| 2007/0005253 A1* | 1/2007 | Fornel | E21B 43/00 702/14 |
| 2007/0265815 A1 | 11/2007 | Couet et al. | |
| 2009/0001985 A1 | 1/2009 | Besson et al. | |
| 2009/0030614 A1 | 1/2009 | Carnegie et al. | |
| 2009/0164188 A1* | 6/2009 | Habashy | E21B 43/00 703/10 |
| 2009/0192714 A1* | 7/2009 | Xue et al. | 702/7 |
| 2010/0004867 A1 | 1/2010 | Zhou et al. | |
| 2010/0017131 A1* | 1/2010 | Glinsky | G01V 3/38 702/6 |
| 2011/0110191 A1* | 5/2011 | Williams-Stroud | G01V 1/288 367/73 |
| 2011/0282635 A1 | 11/2011 | Liu et al. | |
| 2012/0035896 A1* | 2/2012 | Wu | E21B 43/00 703/2 |
| 2012/0075954 A1 | 3/2012 | Xu et al. | |
| 2013/0096900 A1* | 4/2013 | Usadi | G06F 17/5018 703/10 |
| 2014/0214388 A1* | 7/2014 | Gorell | E21B 43/00 703/10 |
| 2014/0350859 A1* | 11/2014 | Lin et al. | 702/7 |
| 2015/0019183 A1* | 1/2015 | Suzuki | E21B 43/16 703/2 |

OTHER PUBLICATIONS

Hou et al., Real-Time Borehole Correction for a New Multicomponent Array Induction Logging Tool in OBM Wells, SPWLA 53rd Annual Logging Symposium, Jun. 16-20, 2012, pp. 1-16 (Year: 2012).*
"International Application Serial No. PCT/US2012/072311, International Search Report dated Sep. 2, 2013", 3 pgs.
"International Application Serial No. PCT/US2012/072311, Written Opinion dated Sep. 2, 2013", 4 pgs.
Hou, J., et al., "Correction for the Borehole Effect of Multicomponent Array Induction Log Data", Progress In Electromagnetics Research Symposium Proceedings (PIERS), (Cambridge, USA, Jul. 5-8, 2010), (2010), 403-404.
"International Application Serial No. PCT/US2012/072311, International Preliminary Report on Patentability dated Jul. 9, 2015", 6 pgs.
"Australian Application Serial No. 2012397811, Examination Report No. 1 dated Mar. 18, 2016", 3 pgs.
"European Application Serial No. 12891081.7, Extended European Search Report dated Nov. 2, 2015", 7 pgs.
"Canadian Application Serial No. 2,893,744, Office Action dated Jun. 14, 2016", 4 pgs.
"Gulf Cooperation Council Application Serial No. 2013-26181, First Examiner Report dated Jan. 12, 2017", 4 pages.

* cited by examiner

MEASUREMENT CORRECTION APPARATUS, METHODS, AND SYSTEMS

CLAIM OF PRIORITY

This application is a U. S. National Stage Filing under 35 U.S.C. § 371 of International Application PCT/US2012/072311, filed on 31 Dec. 2012, and published as WO 2014/105083 A1 on 3 Jul. 2014, which application and publication are hereby incorporated by reference herein in their entirety.

BACKGROUND

Multi-Component Induction (MCI) logging can provide formation anisotropic-resistivity information, which can be used to analyze sand-shale laminations, for example. However, the MCI measurements are highly sensitive to borehole effects, especially for non-ZZ measurements of short-spacing arrays operated at high frequencies.

For conventional (ZZ) induction tools, an operation known to those of ordinary skill in the art as "borehole correction" is useful to correct the MCI measurements, based on a look-up table of MCI responses. In standard (ZZ) induction tools, the model parameters that are used in building a borehole-correction look-up table include: $R_m$, $R_f$, D, d, which represent mud resistivity, formation resistivity, borehole diameter, and tool eccentricity, respectively. For MCI however, there are more parameters: $R_m$, $R_v$, $R_h$, A, D, d, $\phi$, $\theta$, and $\varphi$, representing mud resistivity, formation vertical resistivity, formation horizontal resistivity, the formation anisotropy ratio ($A=R_v/R_h$), borehole diameter, tool eccentricity, strike angle, dip angle, and tool eccentricity angle (or azimuth), respectively. Due to the larger number of parameters, the look-up table for an MCI tool requires four additional dimensions, producing a very large database. Moreover, the physics of anisotropic wave propagation is more complicated than the isotropic case, and modeling each case takes a significant amount of computational time.

DETAILED DESCRIPTION

To address some of the challenges described above, as well as others, apparatus, systems, and methods are described herein that provide computationally efficient mechanisms for correcting down hole log data (e.g., resistivity logs) due to environmental effects. Traditional environmental correction and inversion algorithms are based on a single database, which can consume a lot of time and memory to use. The methodology disclosed here is based on the use of two modeling algorithms, one of which is more computationally efficient (faster) but relatively inaccurate (ALG I), while the other is costly in a computational sense (slower) and relatively accurate (ALG II). In short, ALG I is faster to implement, and provides less accurate results than ALG II.

When various embodiments of the invention are implemented, it is possible to have a database operating at the speed of ALG I, and with the accuracy of ALG II. Various embodiments can be used for borehole data correction, or two-dimensional, three-dimensional (2D/3D) inversion of MCI logs. As those of ordinary skill in the art will realize after reading the following description, and reviewing the figures, various embodiments can be adapted to other types of correction and inversion algorithms with respect to data acquired by logging tools, such as for correction of dip, stand-off, anisotropy, shoulder effects, etc.

Figure 1:
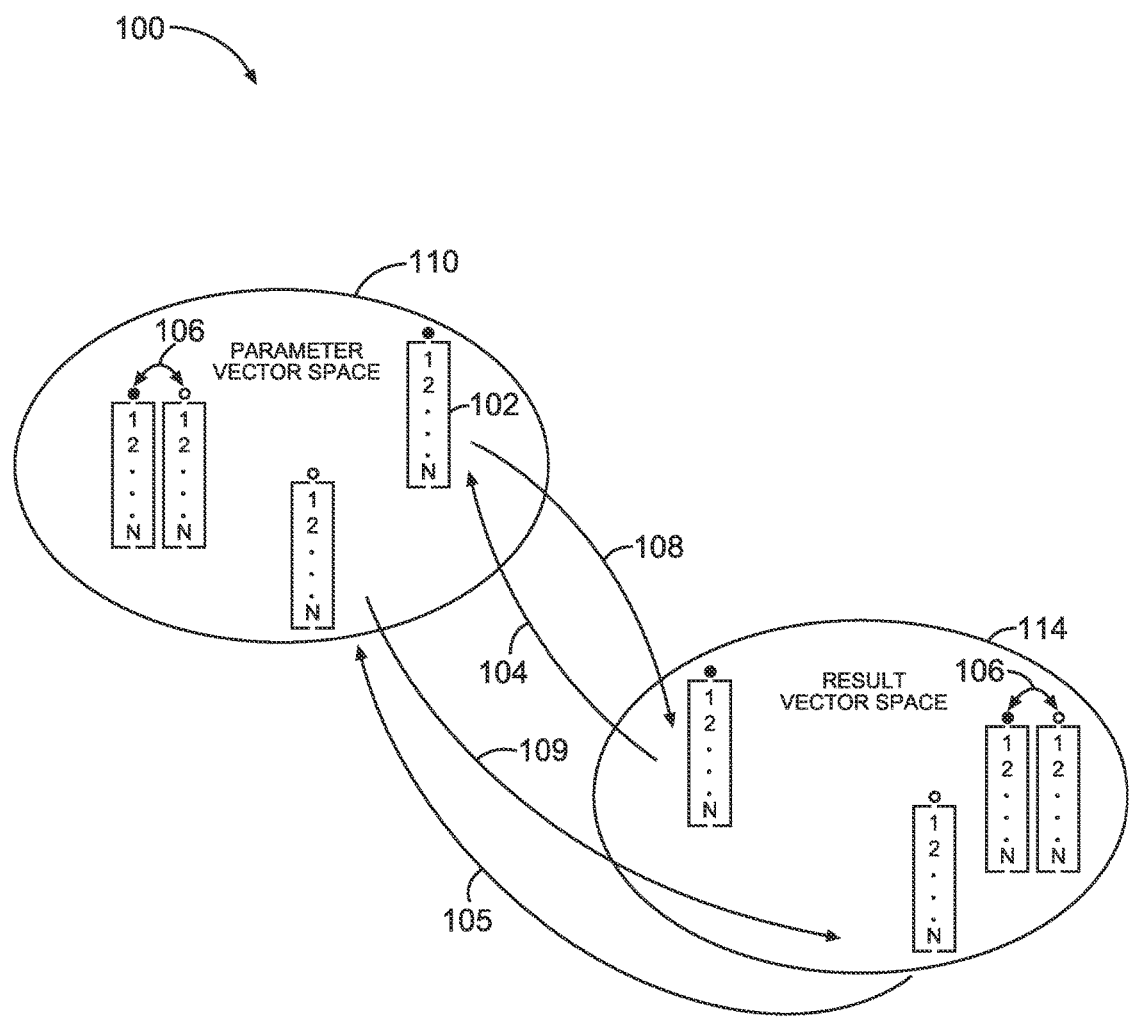
FIG. 1 is a flow diagram illustrating two-way map, from a parameter vector space to a result vector space, and vice-versa, according to various embodiments of the invention.

FIG. 1 is a flow diagram illustrating a two-way map 100, from a parameter vector space 110 to a result vector space 114, and vice-versa, according to various embodiments of the invention. The parameter vector space 110 comprises a physical parameter space. The result vector space 114 comprises a measured or modeled data space.

Actual measurements that characterize a geological formation can be acquired to populate the result vector space 114. In some embodiments, a two-way functional mapping can be applied to associate a synthetic result in the parameter vector space 110 with a corrected synthetic result in the result vector space 114. In some embodiments, a two-way functional mapping can be applied to the actual measurements in the result vector space 114 to determine corresponding fast modeling measurement results in the result vector space 114.

An "open circle" above a vector represents a vector associated with ALG II operations, and a "filled circle" above a vector represents a vector associated with ALG I operations. Thus, an open circle in the parameter vector space 110 represents an accurate modeling parameter, and an open circle in the result vector space 114 represents an accurate modeling result. A filled circle in the parameter vector space 110 represents a fast modeling parameter, and a filled circle in the result vector space 114 represents a fast modeling result.

In some embodiments, the transformed measurement results can be inverted to locate a corresponding set of physical parameters in the parameter vector space 110 (to determine geological formation characteristic values). In some embodiments, the actual measurements are inverted to locate the corresponding set of physical parameters in the parameter vector space 110, using a comparison between the corrected synthetic result, and the actual measurements.

The first modeling operations 108 (e.g., ALG I) transform fast modeling parameter vectors in the parameter vector space 110 into fast modeled measurement results in the result vector space 114. Inversion 104, based on the first modeling operations 108, can be used to transform fast modeled measurement results in the result vector space 114 into fast modeling parameter vectors in the parameter vector space 110.

Similarly, the second modeling operations 109 (e.g., ALG II) transform accurate modeling parameter vectors in the parameter vector space 110 into accurate modeled measurement results in the result vector space 114. Inversion 105, based on the second modeling operations 109, can be used to transform actual measurements or accurate modeling results in the result vector space 114 into accurate modeling parameter vectors in the parameter vector space 110.

Thereafter, bridge mapping 106 can be used to transform accurate modeled measurement results, or actual measurements into fast modeled measurement results; this process is defined herein as "AF" (accurate=>fast) mapping. Conversely, the bridge mapping 106 can be used to transform fast modeled measurement results into accurate modeled measurement results (transformation into "actual measurements" is not possible); this process is defined herein as "FA" (fast=>accurate) mapping.

One example of a process that can be executed within the two-way mapping space comprises dual database curve fitting. This mechanism is based on use of the two algorithms: ALG I and ALG II. By definition, ALG I is not very accurate but computationally less time consuming than ALG II, whereas ALG II is more accurate while being computationally more time consuming than ALG I. Example scenarios with ALG I and ALG II are listed in Table 1.

TABLE I

| ALGORITHM I (ALG I) | ALGORITHM II (ALG II) |
| --- | --- |
| Faster to implement. | Slower to implement. |
| Simplified geometry. | Detailed geometry. |
| Convergence is not guaranteed. | Convergence guaranteed with sufficient iterations. |
| Mathematical functions calculated with a higher error tolerance. | Mathematical functions calculated with a lower error tolerance. |

Figure 2:
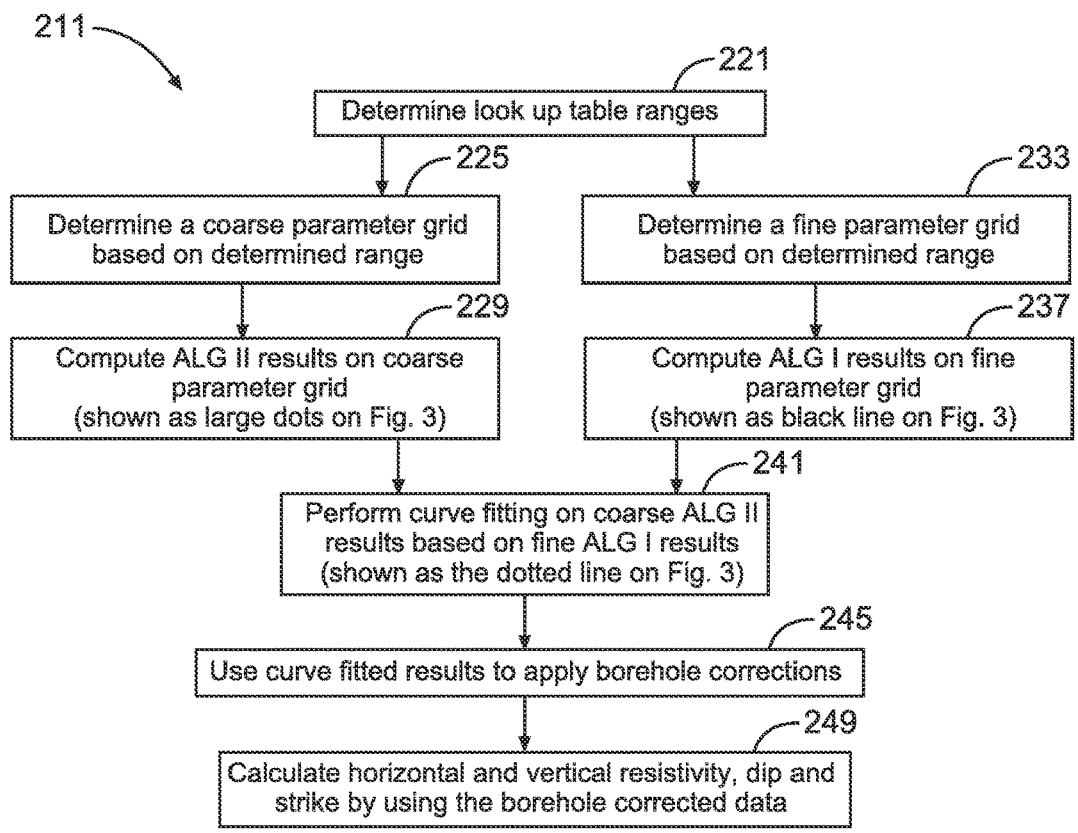
FIG. 2 is a flow chart illustrating a dual-algorithm curve fitting method according to various embodiments of the invention.

FIG. 2 is a flow chart 211 illustrating a dual-algorithm curve fitting method according to various embodiments of the invention. The method 211 combines the use of ALG I and ALG II to benefit from the relative speed of ALG I, and the relative accuracy of ALG II.

At block 221, the appropriate ranges in the look-up table are determined, based on the expected or actual ranges of acquired data (e.g., actual measurements made down hole). Based on the expected or actual range of values in the acquired data, a fine parameter grid is established at block 233. This fine parameter grid may include some or all of the measured values for a particular parameter. Some of the fine parameter grid points (a subset) are selected to establish a coarse parameter grid at block 225.

At block 229, ALG II is applied to the values in the coarse parameter grid (shown in FIG. 3, described below, as large dots). At block 237, ALG I is applied to the values in the fine parameter grid (shown in FIG. 3, described below, as a solid line).

At block 241, curve fitting occurs. The curve fitting may be based on a combination of parameters or a single parameter dimension. In essence, the results provided by ALG I over many points on the fine grid are scaled to the results provided by ALG II over a few points on the course grid. Some parameters respond more accurately to the curve fitting activity than others.

At block 245, the results of curve fitting (at block 241) are used to correct the measurements made down hole, so that a borehole correction is applied to the measurements that have been made, with respect to the parameters for which the method 211 has been applied. The corrected measurements can be used to calculate many characteristics of the formation and borehole, such as horizontal and vertical resistivity, dip, and strike.

Figure 3:
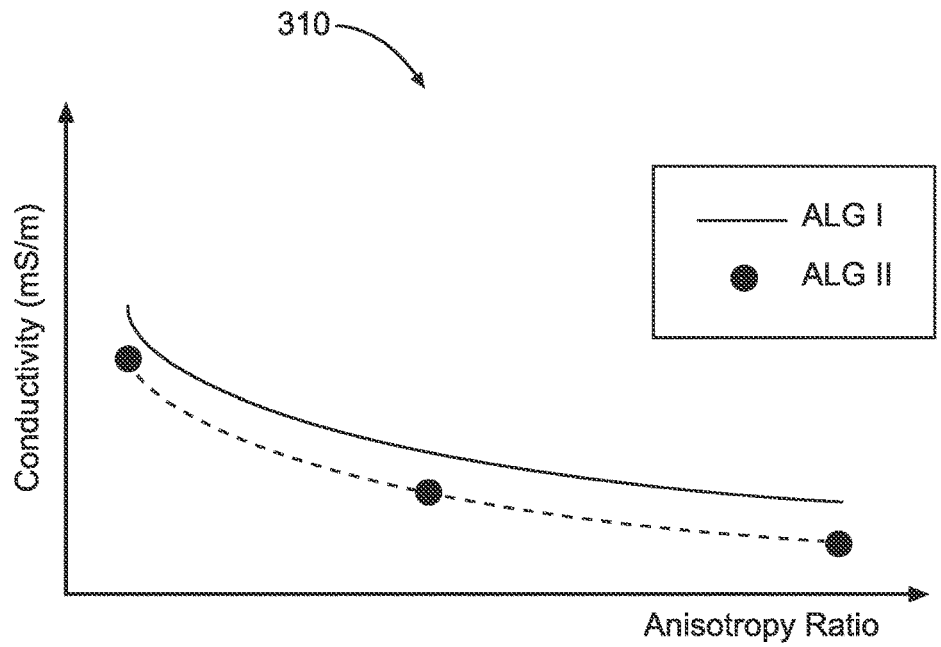
FIG. 3 is a graph that illustrates curve scaling according to various embodiments of the invention.

FIG. 3 is a graph 310 that illustrates curve scaling according to various embodiments of the invention. Here a sketch of the ALG I curve (shown as a solid line) being scaled down to the ALG II curve (shown with large dotes), as applied to the formation anisotropy ratio $R_v/R_h$. Other parameters to which the scaling may be applied are: horizontal resistivity $R_h$, relative dip $\theta$, relative strike $\phi$, and caliper size, among others. It is noted that the method 211 of FIG. 2 can be applied to any of these parameters. However, for reasons of simplicity, and because they produce a useful curve fitting performance, only the application to anisotropy ratio and caliper size will be discussed in more detail herein. It should also be understood that certain variations can be made to the algorithms described herein and similar performance can be obtained. Thus, the examples provided in this document are not intended to be limiting.

Figure 4:
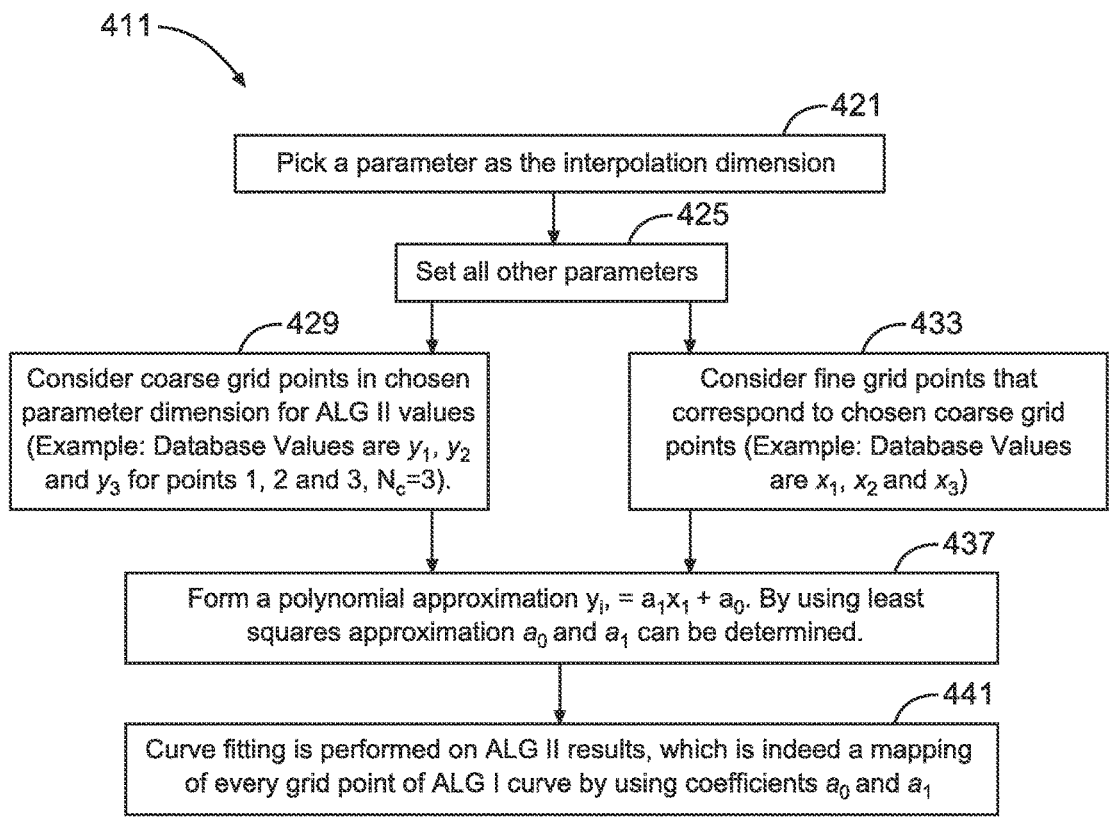
FIG. 4 is a work flow diagram that can be used for dual-algorithm curve fitting according to various embodiments of the invention.

FIG. 4 is a work flow diagram 411 that can be used for dual-algorithm curve fitting according to various embodiments of the invention. For curve fitting in a single dimension, one can assume that a database holds $N_f$ fine grid points. Experimental results indicate that $N_c$ grid points (a subset of $N_f$ fine grid points) will provide a desired amount of accuracy for curve fitting when ALG II is applied. By selecting a subset of $N_f$ fine grid points, a computational time reduction of approximately $N_f/N_c$ is implied.

To begin, a single parameter (e.g., the anisotropy ratio) is chosen to be the interpolation dimension at block 421. The remaining parameters (e.g., caliper size) to be scaled are selected at block 425.

At block 429, $N_c$ coarse grid points are selected as a subset of the $N_f$ fine grid points that exist with respect to the chosen interpolation parameter. ALG II is applied to the $N_c$ coarse grid points. These $N_c$ coarse grid points will serve as the independent variable in a polynomial approximation.

At block 433, the $N_f$ fine grid points corresponding to the $N_c$ coarse grid points are selected to represent independent variable values in the polynomial approximation.

Scaling coefficients in the polynomial approximation can then be determined using a least squares approximation, with the chosen values for the independent and dependent variable, at block 437.

Finally, curve fitting is performed at block 441, to map the $N_f$ fine grid points to the ALG II results for the $N_c$ coarse grid points.

Figure 5A:
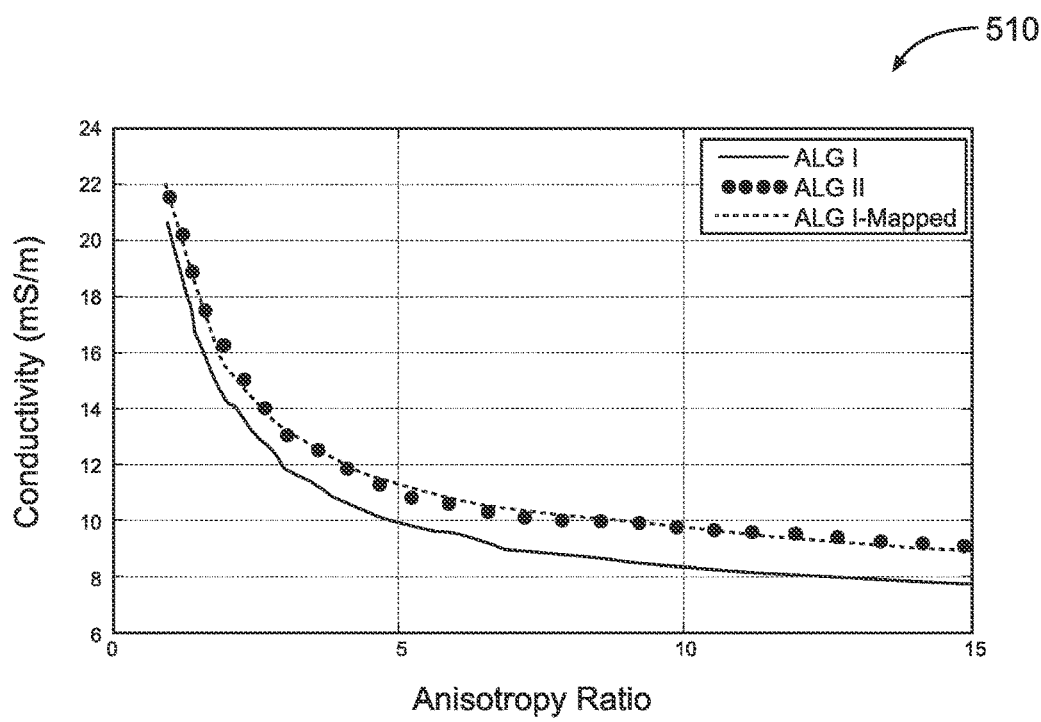
FIGS. 5A and 5B illustrate mapping and error graphs according to various embodiments of the invention.
Figure 5B:
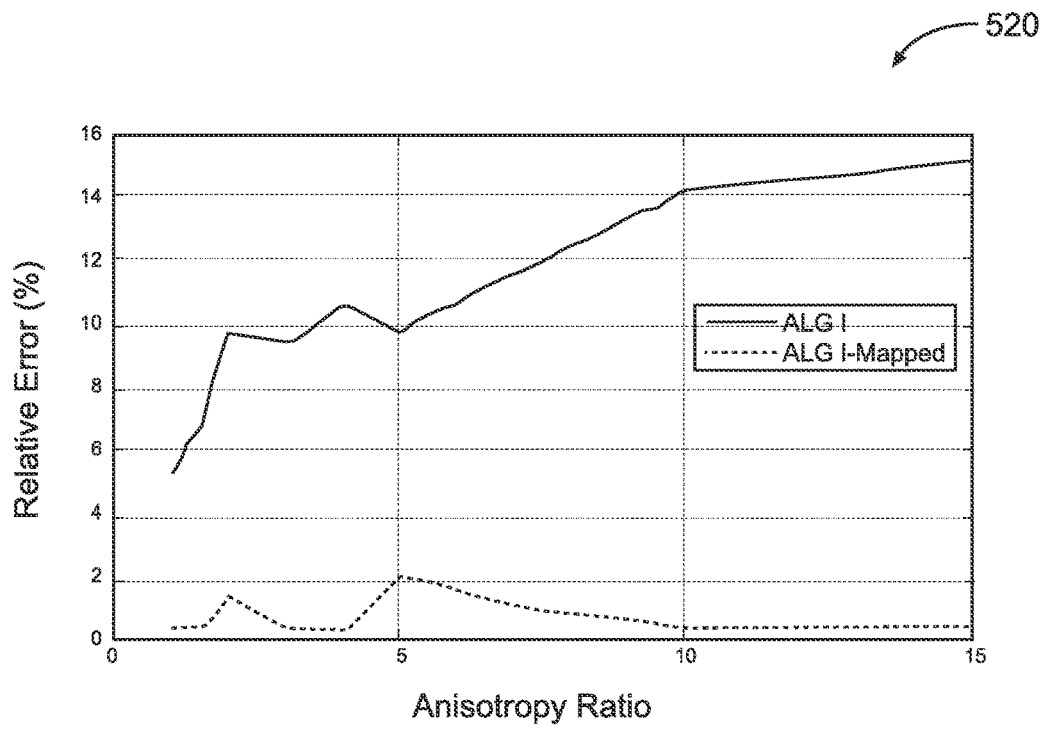

FIGS. 5A and 5B illustrate mapping and error graphs 510, 520 according to various embodiments of the invention. In FIG. 5A, conductivity over a range of anisotropy ratio test data for ALG I, ALG II, and ALG I-mapped results is shown. In FIG. 5 GB, the relative error of the original ALG I results, compared to the ALG I-mapped results, with respect to ALG II, is shown.

FIGS. 5A and 5B demonstrate the robustness of the method shown in FIG. 4, where curve fitting is applied to the anisotropy ratio parameter, when $N_f$=9 and $N_c$=3. Here the caliper size is chosen to be 8 inches; the dip angle is 40°, and Rh is 50 Ωm. The tool is 0.8 inch eccentric to the Z axis of the borehole. The eccentricity angle is 90° and the coupling is XX.

In FIG. 5A, the results of ALG I are denoted by the solid line, and the large dotted line denotes the results of ALG II. The dashed line designates the ALG I-mapped final result of the method shown in FIG. 4.

In FIG. 5B, the solid line gives the relative percentage error between the results obtained via ALG I and ALG II. The dashed line indicates the relative percentage error between the ALG I-mapped results and the results of ALG II. It is evident that the ALG I-mapped result provides a good approximation to the ALG II results, because the relative error is about 2% or less at all points. Thus, the speed of ALG I has largely been obtained with 98% of the accuracy of ALG II.

Figure 6:
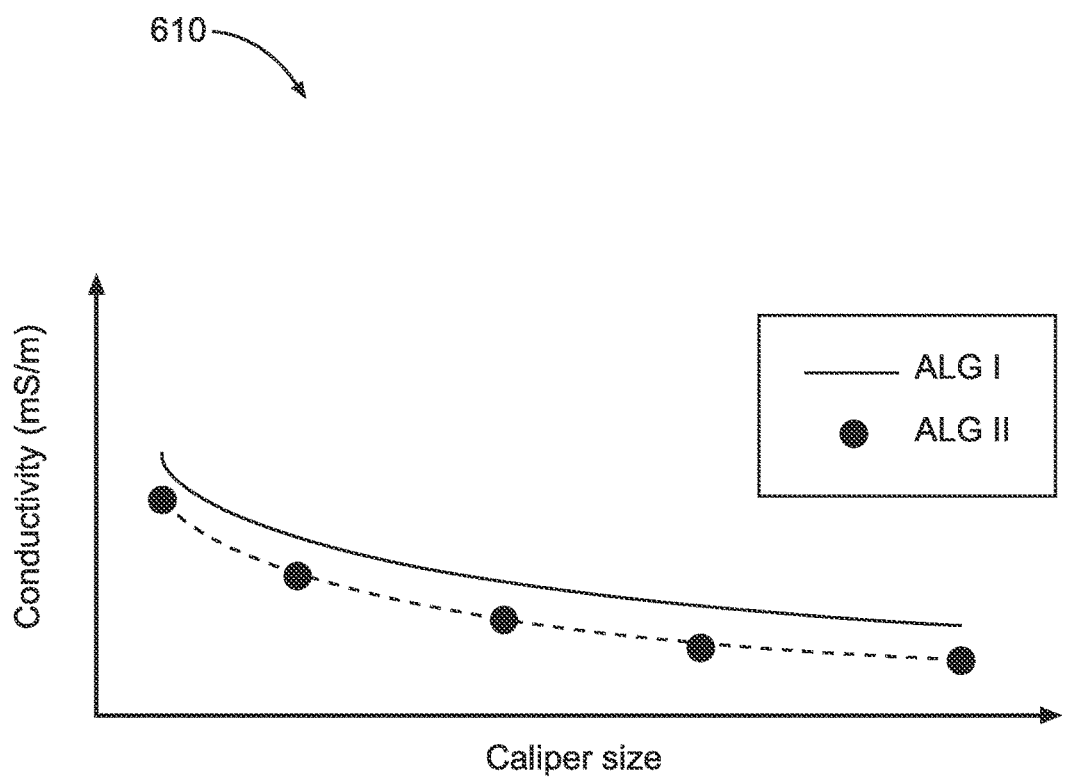
FIG. 6 is a graph that illustrates caliper size curve scaling according to various embodiments of the invention.

FIG. 6 is a graph 610 that illustrates caliper size curve scaling according to various embodiments of the invention. Here a sketch of ALG I scaling down to ALG II using a caliper size grid is shown. In the fine grid domain, for ALG I, there are 19 caliper size grid points. Over a range of 6 inches to 15 inches, the grid points are distributed evenly at 0.5 inch intervals. Experimental results indicate that 4-5 grid points of ALG II will provide sufficient accuracy with respect to the scaling coefficients for caliper size.

The scaling coefficients are computed according to the method of FIG. 4. Curve fitting is thus performed on the ALG II results, to map every grid point of the ALG I curve (solid line) to the ALG II curve (dashed line) using the determined coefficients. In this case, a reduction in computation time of about 5/19 is obtained.

Figure 7A:
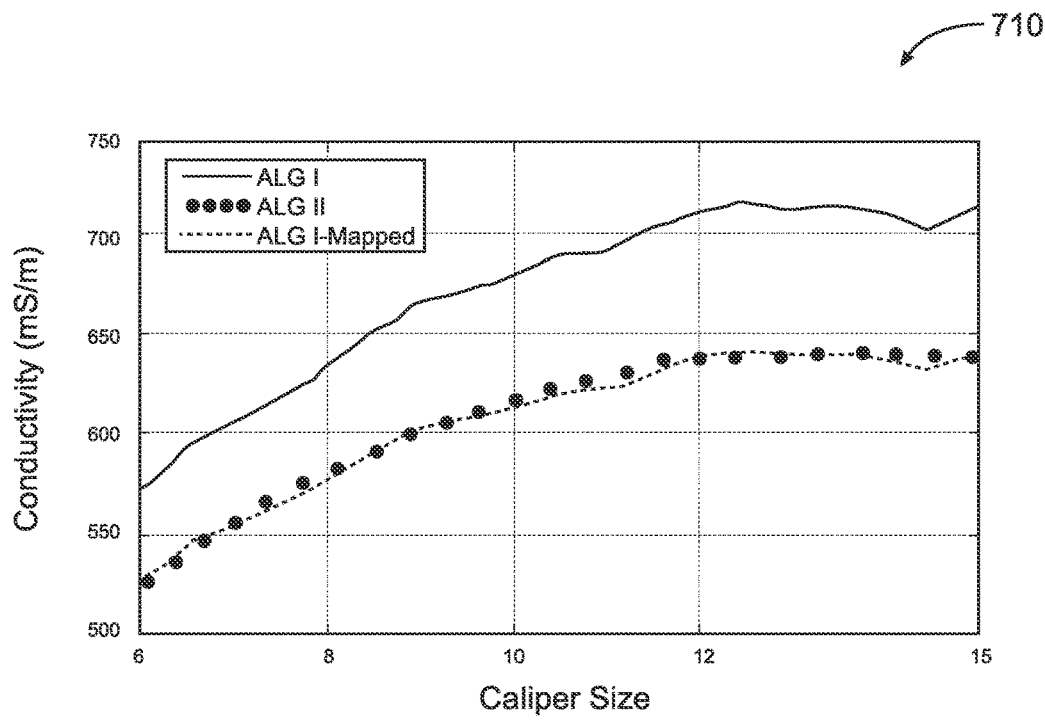
FIGS. 7A and 7B illustrate mapping and error graphs according to various embodiments of the invention.
Figure 7B:
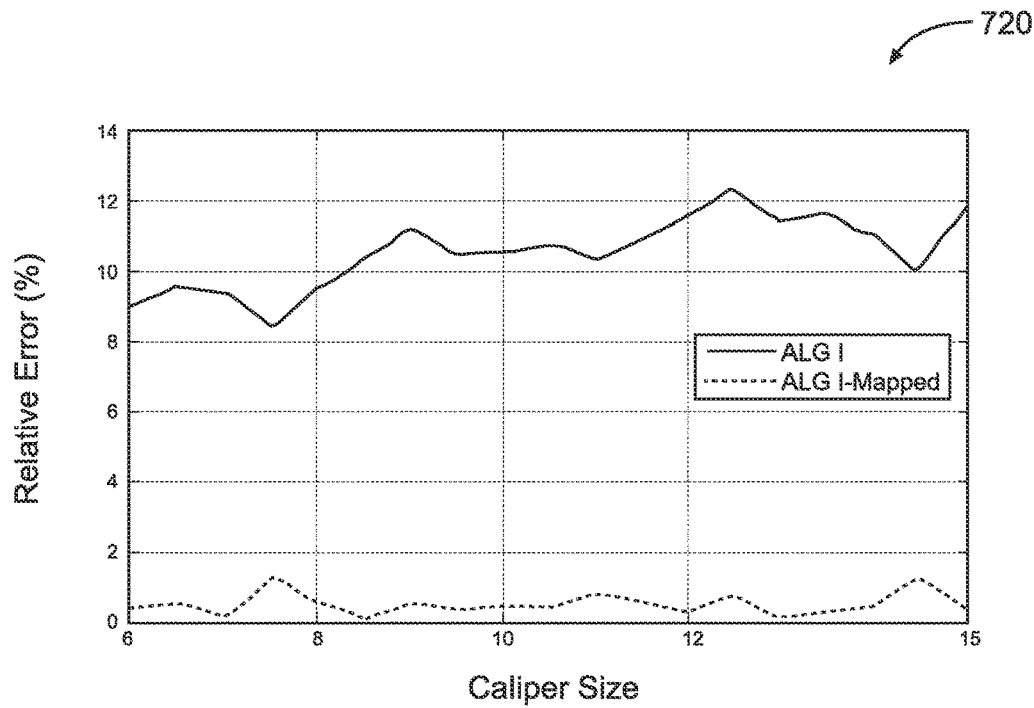

FIGS. 7A and 7B illustrate mapping and error graphs 710, 720 according to various embodiments of the invention. To demonstrate how powerful the application to caliper size parameters can be, a new test case is presented. In FIG. 7A, the results from ALG I (solid line), ALG II (large dotted line), and the ALG I-mapped result (dashed line) is shown for the test case. In FIG. 7B, the relative error of original the ALG I results with respect to the ALG II results (solid line) and the ALG I-mapped results with respect to the ALG II results (dashed line) are shown. In each case, the dip angle is 30°, with Rh and Rv being 1 and 2 Ωm respectively. The tool is eccentric to the axis of the borehole, with an eccentricity angle of 90° and YY coupling. It is evident from FIG. 7B that the ALG I-mapped result provides a good approximation to the ALG II results, because the relative error is less than 2% over all points (which is more than five times better than most of the ALG I results). Again, the speed of ALG I has more or less been obtained with almost 99% of the accuracy of ALG II.

Figure 8:
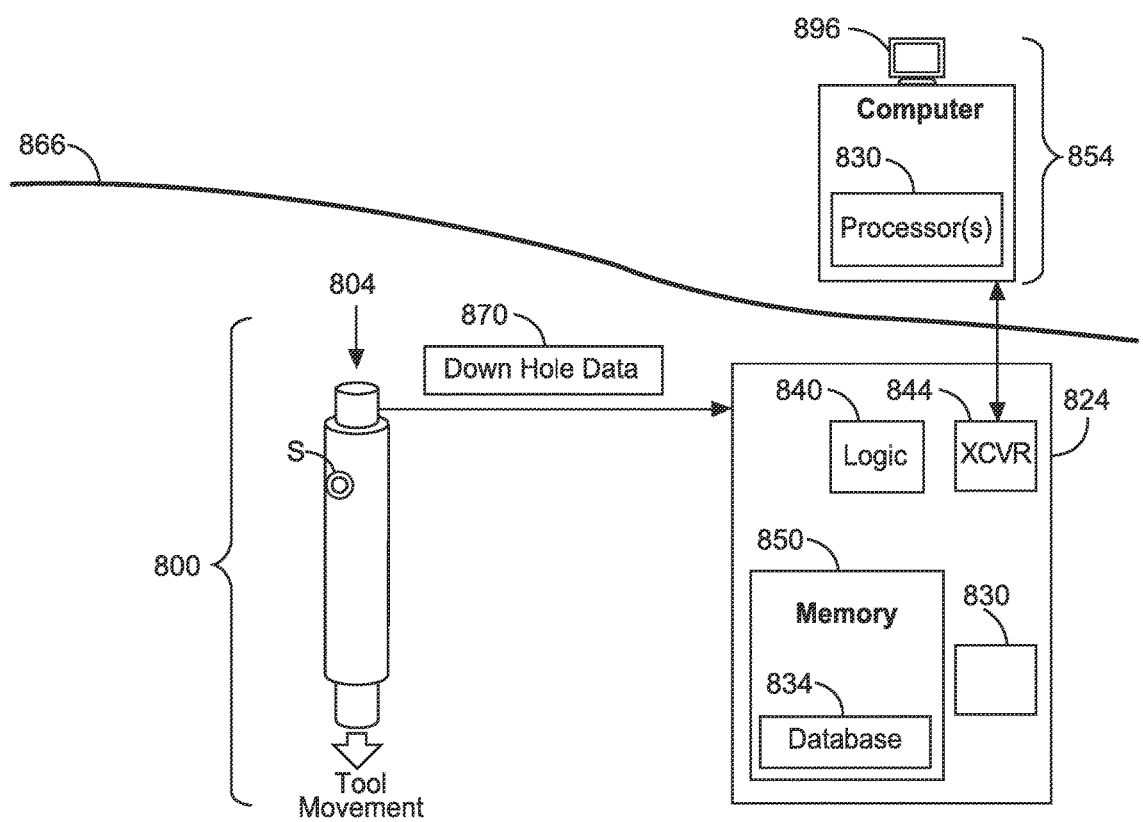
FIG. 8 is a block diagram of apparatus and systems according to various embodiments of the invention.

FIG. 8 is a block diagram of apparatus 800 and systems 864 according to various embodiments of the invention. For example, in some embodiments an apparatus 800 comprises a housing 804 and one or more sensors S attached to the housing 804, where the sensors S operate to measure formation and borehole characteristics, providing down hole log data 870. This data 870 may be collected under the control of circuit logic 840, perhaps as part of a data acquisition system 824.

The apparatus 800 may further include one or more processors 830 housed by the housing 804, or in a surface workstation 854. A transceiver 844 may be used to receive commands from the workstation 854, and to transmit the data 870, or a corrected version of the data 870, to the surface 866. The processors 830 may operate to correct inaccuracies in the measurements forming part of the data 870, perhaps caused by environmental effects, using various embodiments of the methods described herein. A memory can be located in the housing 804 to store measurements as original log data 870, or corrected log data, or both, perhaps in a database 834.

Thus, referring now to FIGS. 1-8, it can be seen that many embodiments may be realized. For example, a system 864 may comprise a housing 804, one or more sensors S to acquire data 870, and a processor 830 to generate and apply a correction map to geological formation model parameters based on the acquired data 870.

In some embodiments, a system 864 comprises a housing 804, at least one down hole sensor S attached to the housing 804, the at least one down hole sensor S to provide an actual measurement (e.g., forming part of the log data 870) characterizing a geological formation. The system 864 may further comprise a processor 830 to calculate an AF map that transforms accurate modeled measurement results into fast modeled measurement results within a modeled data space. The processor 830 may further operate to receive the actual measurement from the down hole sensor S, and to transform the actual measurement into the fast modeled measurement results using the AF map. The processor 830 may also operate to transform the fast modeled measurement results into a modeling parameter vector via inversion.

In various embodiments, the processor 830 can be down hole, or located on the surface 866. Thus, the processor 830 may be located in a workstation 854 at the surface 866, perhaps as part of a surface logging facility. The processor 830 may be configured to process at least a portion of the modeling parameter vector to represent a value of at least one property of a geological formation on a display 896.

Among others, the down hole sensors S may comprise induction logging tools and caliper tools. Thus, the down hole sensor S may comprise at least one of a multi-element induction logging tool or a caliper tool.

A transmitter can be used to send data to the surface for processing. Thus, the system 864 may comprise a telemetry transmitter (e.g., forming part of the transceiver 844) to communicate the actual measurement (e.g., forming part of the log data 870) from the housing 804 to a surface workstation.

The housing may comprise a variety of tools, such as wireline, logging while drilling (LWD), or measurement while drilling (MWD) tools. Thus, in some embodiments, the housing 804 comprises one of a wireline tool or an MWD tool.

The processor can be used to correct sensor measurements that are distorted due to borehole effects. As an example, the corrected model parameters may be applied to down hole measurements (e.g., caliper measurements) to get a corrected measurement. For example, if an actual caliper measurement is taken, the actual measurement can be transformed into the fast modeled measurement results using the AF map, and then the fast modeled measurement results can be transformed into the modeling parameter vector via inversion. Thus, in some embodiments, the processor 830 is configured to transform additional measurements obtained from the at least one down hole sensor S into the fast modeled measurement results using the AF map, and then to transform the fast modeled measurement results into the modeling parameter vector via inversion.

In some embodiments, an apparatus 800 comprises a housing, one or more sensors S attached to the housing, and one or more components of the data acquisition system 824. The components of the apparatus 800 may operate similarly to, or identically to the same elements in the system 864. Additional examples of system embodiments will now be described.

Figure 9:
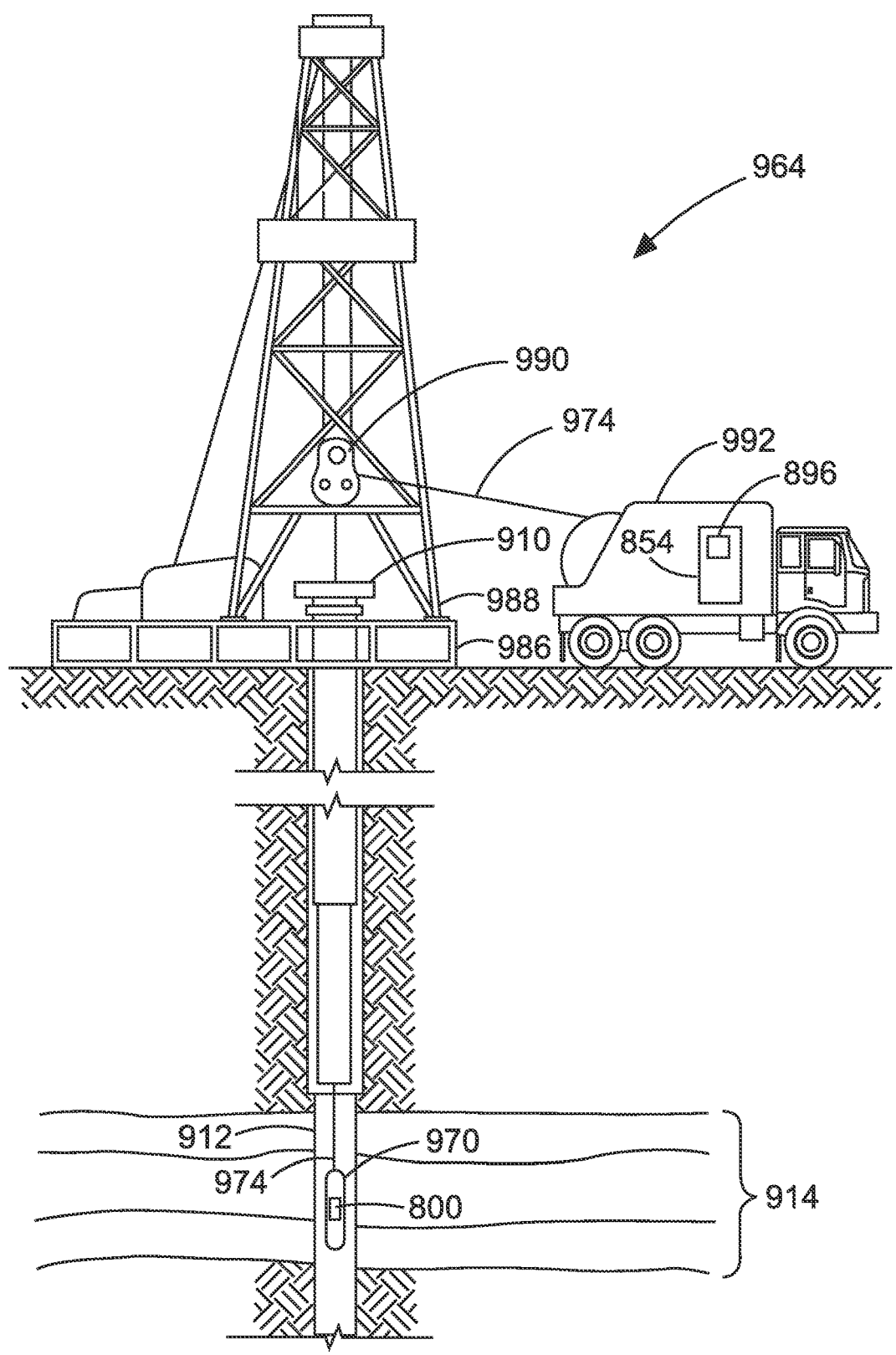
FIG. 9 illustrates a wireline system embodiment of the invention.
Figure 10:
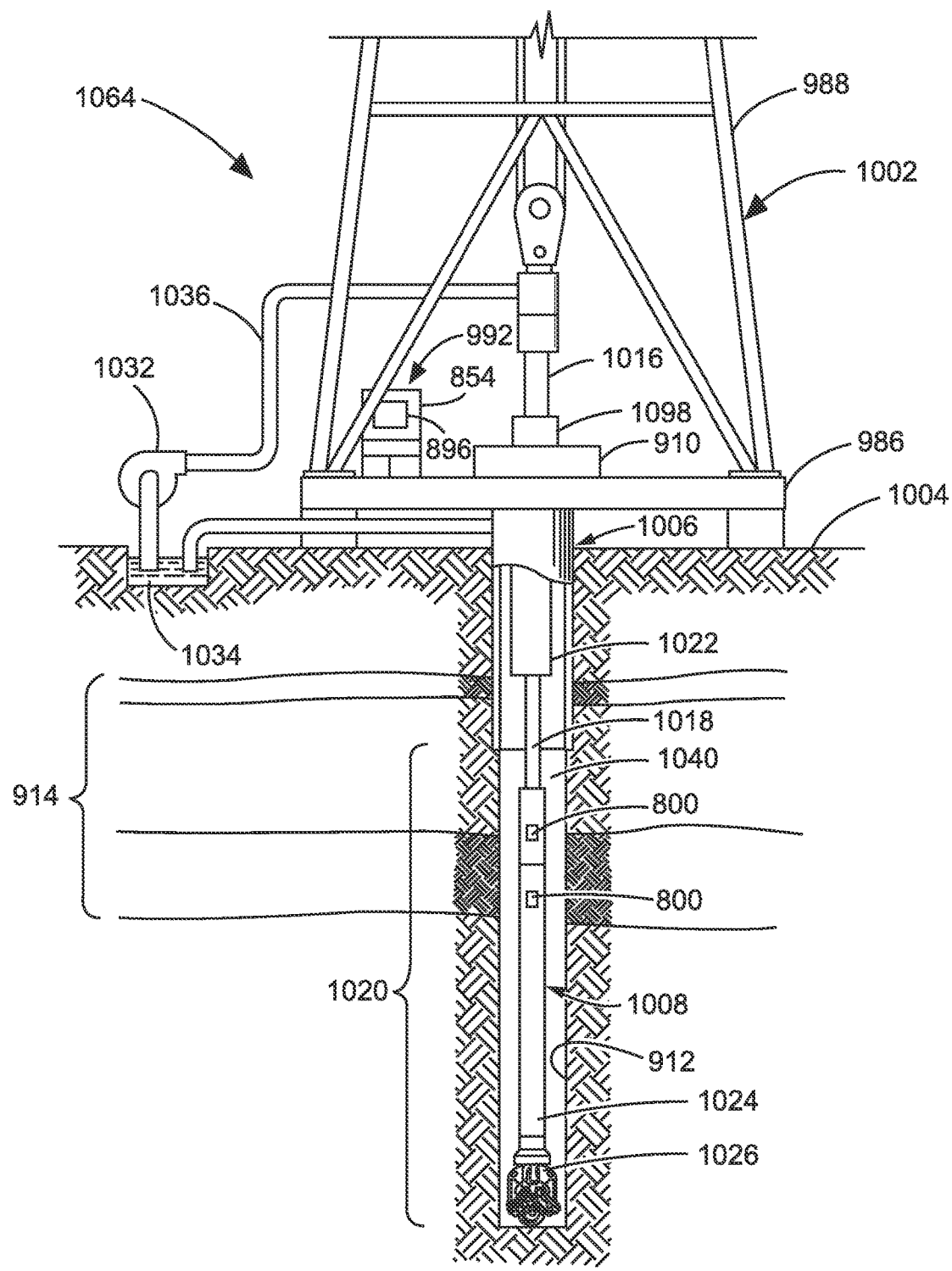
FIG. 10 illustrates a drilling rig system embodiment of the invention.

FIG. 9 illustrates a wireline system 964 embodiment of the invention, and FIG. 10 illustrates a drilling rig system 1064 embodiment of the invention. Therefore, the systems 964, 1064 may comprise portions of a wireline logging tool body 970 as part of a wireline logging operation, or of a down hole tool 1024 as part of a down hole drilling operation.

Thus, FIG. 9 shows a well during wireline logging operations. In this case, a drilling platform 986 is equipped with a derrick 988 that supports a hoist 990.

Drilling oil and gas wells is commonly carried out using a string of drill pipes connected together so as to form a drilling string that is lowered through a rotary table 910 into a wellbore or borehole 912. Here it is assumed that the drilling string has been temporarily removed from the borehole 912 to allow a wireline logging tool body 970, such as a probe or sonde, to be lowered by wireline or logging cable 974 into the borehole 912. Typically, the wireline logging tool body 970 is lowered to the bottom of the region of interest and subsequently pulled upward at a substantially constant speed.

During the upward trip, at a series of depths various instruments (e.g., portions of the apparatus 800, or system 864 shown in FIG. 8) included in the tool body 970 may be used to perform measurements on the subsurface geological formations 914 adjacent the borehole 912 (and the tool body 970). The measurement data can be communicated to a surface logging facility 992 for processing, analysis, and/or storage. The logging facility 992 may be provided with electronic equipment for various types of signal processing, which may be implemented by any one or more of the components of the apparatus 100 or system 102 in FIG. 1. Similar formation evaluation data may be gathered and analyzed during drilling operations (e.g., during LWD operations, and by extension, sampling while drilling).

In some embodiments, the tool body 970 is suspended in the wellbore by a wireline cable 974 that connects the tool to a surface control unit (e.g., comprising a workstation 854). The tool may be deployed in the borehole 912 on slickline, coiled tubing, jointed drill pipe, hard wired drill pipe, or any other suitable deployment technique.

Turning now to FIG. 10, it can be seen how a system 1064 may also form a portion of a drilling rig 1002 located at the surface 1004 of a well 1006. The drilling rig 1002 may provide support for a drill string 1008. The drill string 1008 may operate to penetrate the rotary table 910 for drilling the borehole 912 through the subsurface formations 914. The drill string 1008 may include a Kelly 1016, drill pipe 1018, and a bottom hole assembly 1020, perhaps located at the lower portion of the drill pipe 1018.

The bottom hole assembly 1020 may include drill collars 1022, a down hole tool 1024, and a drill bit 1026. The drill bit 1026 may operate to create the borehole 912 by penetrating the surface 1004 and the subsurface formations 914. The down hole tool 1024 may comprise any of a number of different types of tools including MWD tools, LWD tools, and others.

During drilling operations, the drill string 1008 (perhaps including the Kelly 1016, the drill pipe 1018, and the bottom hole assembly 1020) may be rotated by the rotary table 910. Although not shown, in addition to, or alternatively, the bottom hole assembly 1020 may also be rotated by a motor (e.g., a mud motor) that is located down hole. The drill collars 1022 may be used to add weight to the drill bit 1026. The drill collars 1022 may also operate to stiffen the bottom hole assembly 1020, allowing the bottom hole assembly 1020 to transfer the added weight to the drill bit 1026, and in turn, to assist the drill bit 1026 in penetrating the surface 1004 and subsurface formations 414.

During drilling operations, a mud pump 1032 may pump drilling fluid (sometimes known by those of ordinary skill in the art as "drilling mud") from a mud pit 1034 through a hose 1036 into the drill pipe 1018 and down to the drill bit 1026. The drilling fluid can flow out from the drill bit 1026 and be returned to the surface 1004 through an annular area 1040 between the drill pipe 1018 and the sides of the borehole 912. The drilling fluid may then be returned to the mud pit 1034, where such fluid is filtered. In some embodiments, the drilling fluid can be used to cool the drill bit 1026, as well as to provide lubrication for the drill bit 1026 during drilling operations. Additionally, the drilling fluid may be used to remove subsurface formation cuttings created by operating the drill bit 1026.

Thus, referring now to FIGS. 1-10, it may be seen that in some embodiments, the systems 964, 1064 may include a drill collar 1022, a down hole tool 1024, and/or a wireline logging tool body 970 to house one or more apparatus 800, similar to or identical to the apparatus 800 described above and illustrated in FIG. 8. Components of the system 864 in FIG. 8 may also be housed by the tool 1024 or the tool body 970.

Thus, for the purposes of this document, the term "housing" may include any one or more of a drill collar 1022, a down hole tool 1024, or a wireline logging tool body 970 (all having an outer surface, to enclose or attach to magnetometers, sensors, fluid sampling devices, pressure measurement devices, temperature measurement devices, transmitters, receivers, acquisition and processing logic, and data acquisition systems). The tool 1024 may comprise a down hole tool, such as an LWD tool or MWD tool. The wireline tool body 970 may comprise a wireline logging tool, including a probe or sonde, for example, coupled to a logging cable 974. Many embodiments may thus be realized.

For example, in some embodiments, a system 964, 1064 may include a display 896 to present information, both measured log data 870, and corrected measurements, as well as database information, perhaps in graphic form. A system 964, 1064 may also include computation logic, perhaps as part of a surface logging facility 992, or a computer workstation 854, to receive signals from transmitters and to send signals to receivers, and other instrumentation to determine properties of the formation 914.

Thus, a system 964, 1064 may comprise a down hole tool body, such as a wireline logging tool body 970 or a down hole tool 1024 (e.g., an LWD or MWD tool body), and portions of one or more apparatus 800 attached to the tool body, the apparatus 800 to be constructed and operated as described previously. The processor(s) 830 in the systems 964, 1064 may be attached to the housing 804, or located at the surface 866, as part of a surface computer (e.g., in the surface logging facility 854 of FIG. 8).

The apparatus 800; systems 864, 964, 1064; housing 804; data acquisition system 824; processors 830; database 834; logic 840; transceiver 844; memory 850; surface logging facility 854; surface 866; data 870; display 896; rotary table 910; borehole 912; wireline logging tool body 970; logging cable 974; drilling platform 986; derrick 988; hoist 990; logging facility 992; drill string 1008; Kelly 1016; drill pipe 1018; bottom hole assembly 1020; drill collars 1022; down hole tool 1024; drill bit 1026; mud pump 1032; mud pit 1034; hose 1036; and sensors S may all be characterized as "modules" herein.

Such modules may include hardware circuitry, and/or a processor and/or memory circuits, software program modules and objects, and/or firmware, and combinations thereof, as desired by the architect of the apparatus 800 and systems 864, 964, 1064 and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus 800 and systems 864, 964, 1064 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Such apparatus and systems may further be included as sub-components within a variety of electronic systems, such as televisions, cellular telephones, personal computers, workstations, radios, video players, vehicles, signal processing for geothermal tools and smart transducer interface node telemetry systems, among others. Some embodiments include a number of methods.

Figure 11:
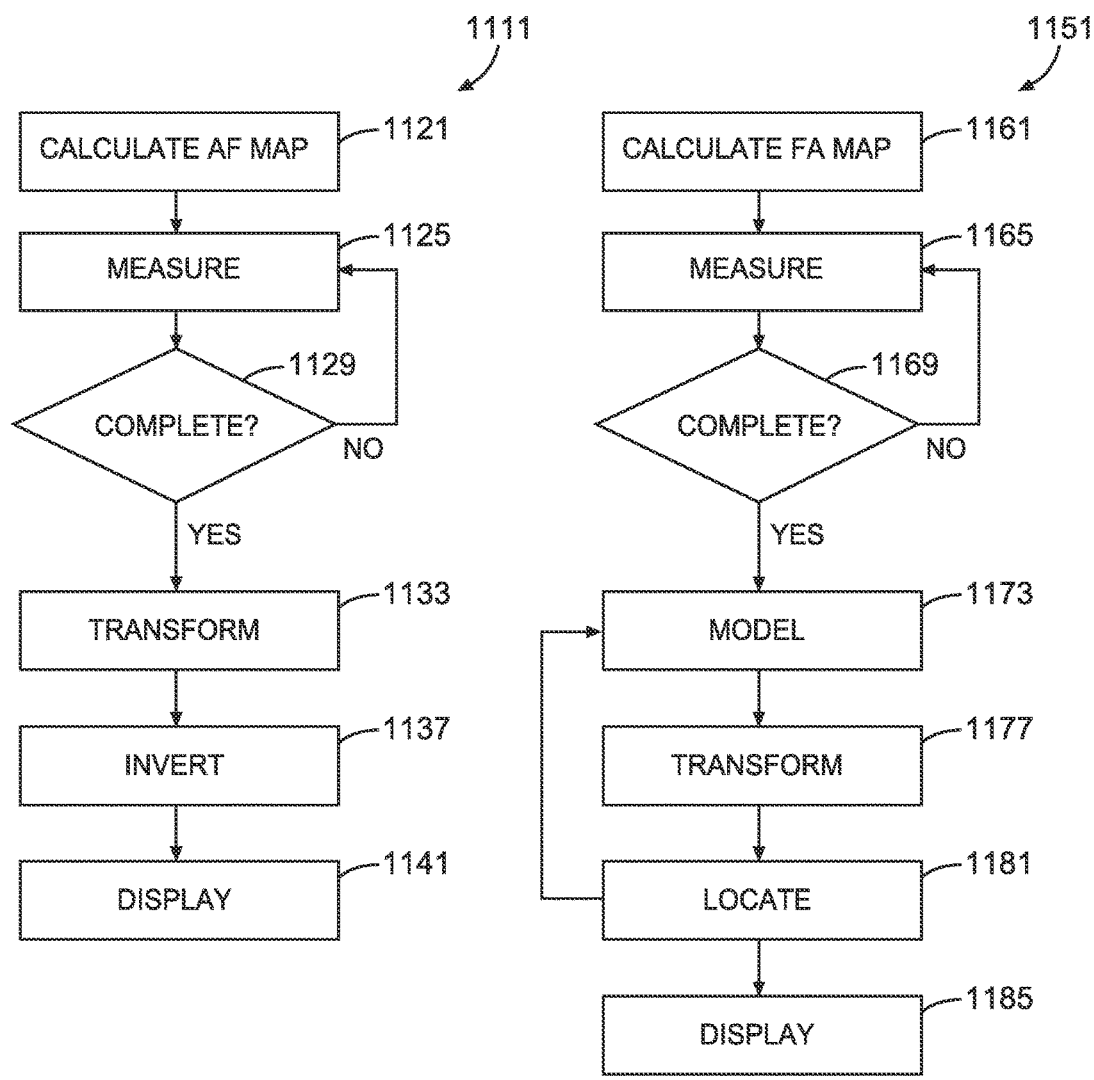
FIG. 11 is a flow chart illustrating several methods according to various embodiments of the invention.

For example, FIG. 11 is a flow chart illustrating several additional methods 1111 according to various embodiments of the invention. For example, one method 1111 may comprise creating an AF map, acquiring data, transforming the acquired data using the AF map, inverting to correct the transformed data, and displaying (as one form of publishing) the corrected data.

In some embodiments, a processor-implemented method 1111, to execute on one or more processors that perform the method 1111, begins at block 1121 with calculating an AF map that transforms accurate modeled measurement results into fast modeled measurement results within a modeled data space.

To calculate the AF map, any one or more of the following activities may occur: (a) a set of one or more modeling parameter vectors is chosen, which may form a grid of vectors; (b) accurate modeling is used to calculate accurate modeled measurement results; (c) fast modeling is used to calculate fast modeled measurement results; (d) an analytical function is chosen that contains a set of fitting parameters to map one modeled measurement result to another (e.g., accurate modeled measurement results mapped to fast modeled measurement results); (e) fitting parameters are chosen such that the analytical function substantially maps accurate modeled measurement results to fast modeled measurement results over the grid of modeling parameter vectors.

Thus, the process of calculating the AF map at block 1121 may comprise calculating the accurate modeled measurement results; and calculating the fast modeled measurement results. Additional activity at block 1121 may comprise selecting fitting parameters for an analytical function to map the accurate modeled measurement results to the fast modeled measurement results over a grid of modeling parameter vectors including the modeling parameter vector.

Modeling can be used in calculating the AF map and/or in the inversion activities. Thus, any one or more of an analytical method, a finite difference method, an integral equation method, or a semi-analytical method can be used while calculating the AF map (and while inverting at block 1137, as described below) to transform the fast modeled measurement results.

The method 1111 may continue on to block 1125 with making an actual measurement using a tool disposed in a borehole. The actual measurement data may comprise data obtained from an induction logging tool. Thus, the actual measurement may comprise a measurement made using an induction logging tool.

If the measurement process is not complete, as determined at block 1129, the method 1111 may return to block 1125, to obtain additional measurements. Otherwise, if the measurement process is complete, as determined at block 1129, the method 1111 may continue on to block 1133.

At block 1133, the method 1111 may include transforming the actual measurement into the fast modeled measurement results using the AF map. Since the AF map can be used to transform the actual measurement, the activity at block 1133 may include transforming the actual measurement by applying an analytical function to the actual measurement.

The method 1111 may continue on to block 1137 with inverting to transform the fast modeled measurement results into a modeling parameter vector. Inversion in this case comprises an optimization process well known to those of ordinary skill in the art, where a search is conducted to find an input that provides the desired output. In this case, the fast measurement results are inverted. There are many different ways to accomplish inversion, including iterative methods (e.g., conjugate gradient, Gauss-Newton, etc.) and look-up table based methods. Inverting to transform the fast modeled measurement results at block 1137 may comprise searching the fast modeled measurement results to provide elements of the modeling parameter vector.

The method 1111 may continue on to conclude at block 1141 with displaying at least a portion of the modeling parameter vector to represent at least one property of a geological formation, such as horizontal or vertical resistivity, anisotropy ratio, dip angle, strike angle, borehole diameter, mud resistivity, and porosity, among others.

Thus, at least parts of the modeling parameter vector can be viewed directly, including various formation parameters such as formation resistivity, borehole size, anisotropy ratio, anisotropy direction, etc. Any of these can be visualized as a function of logging depth. Therefore, the activity at block 1141 may comprise processing the modeling parameter vector to provide an image of the processed values, including formation resistivity, for publication to a display.

Many other methods may be realized. For example, in some embodiments, a method 1151 may comprise creating an FA map, acquiring data, modeling to transform modeling vectors into FA map input data, transforming the map input data into corrected data using the FA map, finding a modeling vector to match the corrected data, and displaying the matching modeling vector. For a given set of data, application of the first forward modeling algorithm (e.g., ALG I) in this case is faster, and less accurate, than application of the second forward modeling algorithm (e.g., ALG II). Nc is the number of coarse points, and Nf is the number of all (fine)

points in the acquired data. The first and second forward modeling algorithms ALG I, ALG II are applied to different data sets—the first set is a coarse grid data set, and the second set is set of fine data points of which the coarse grid data set is a subset. The fine parameter grid points are used in ALG I, and the course parameter grid points are used in ALG II.

Thus, a processor-implemented method 1151, to execute on one or more processors that perform the method 1151, may begin at block 1161 with calculating an FA map that transforms fast modeled measurement results into accurate modeled measurement results within a modeled data space.

To calculate the FA map, any one or more of the following activities may occur: (a) a set of one or more modeling parameter vectors is chosen to form a grid of vectors; (b) fast modeling is used to calculate fast modeled measurement results; (c) accurate modeling is used to calculate accurate modeled measurement results; (d) an analytical function is chosen that includes a set of fitting parameters to map the modeled measurement results, one to another (e.g., to map the fast modeled measurement results to the accurate modeled measurement results); and (e) the fitting parameters are chosen, such that the analytical function substantially maps the fast modeled measurement results to the accurate modeled measurement results over the grid of modeling parameter vectors. For example, executing the activities in blocks 221, 225, 229, 233, and 237 in FIG. 2 may be used to create an FA map.

As noted previously, a polynomial approximation may be used to create the FA map, using curve fitting to map coarse points onto a fine point curve. In some embodiments, the activity at block 1161 may comprise selecting an analytical function that includes a set of fitting parameters to map the fast modeled measurement results to the accurate modeled measurement results. Thus, the activity at block 1161 may comprise fitting rapid fit curve points to a final curve defined by accurate fit curve points to produce the FA map, using a polynomial approximation.

The number of coarse grid points Nc that will provide a desired amount of accuracy in curve fitting is selected from the set of fine grid points. Guiding principles in the selection of points include attempting to evenly distribute the course grid points over the set of fine points, and knowledge of formation characteristics (e.g., for anisotropy, some values of the fine grid points are more probable than others). It can increase the efficiency of calculations to minimize the number of coarse grid points that are selected, while maintaining the desired level of curve fitting accuracy.

The method 1151 may continue on to block 1165 with making an actual measurement using a tool disposed in a borehole. The actual measurement data may comprise data obtained from an induction logging tool. Thus, the actual measurement may comprise a measurement made using an induction logging tool.

If the measurement process is not complete, as determined at block 1169, the method 1151 may return to block 1165, to obtain additional measurements. Otherwise, if the measurement process is complete, as determined at block 1169, the method 1151 may continue on to block 1173.

At block 1173, the method 1151 may comprise modeling to transform a plurality of modeling parameter vectors into the fast modeled measurement results.

The modeling algorithm can be selected from a number of algorithm types. Thus, the modeling activity at bock 1173 may comprise modeling using one of an analytical method, a finite difference method, an integral equation method, or a semi-analytical method, among others.

The formation model may be defined by a variety of parameter types. Thus, the modeling parameters used in the modeling activity at block 1173 may comprise one or more of horizontal resistivity, anisotropy ratio, relative dip, relative strike, or caliper size.

The method 1151 may continue on to block 1177 with transforming the fast modeled measurement results into the accurate modeled measurement results using the FA map.

The method 1151 may include, at block 1181, locating a matching modeling parameter vector as one of the plurality of modeling parameter vectors that matches the accurate modeled measurement results to the actual measurement.

Modeling parameter vectors are selected as a part of the inversion process. If an iterative method is used, an initial guess is made based on expectations or a priori information. The guess is adjusted during each iteration, until the desired match is made. If a look-up table type of method is used, a sufficiently fine grid of modeling parameter vectors that cover all possible expected values may be chosen. A forward modeling algorithm (e.g., an electromagnetic solver) such as finite-element, finite-difference, method of moments, integral equation, analytical/semi-analytical methods are used to transform the modeling parameter vectors into the fast modeled measurement results.

Thus, the activity at block 1181 may comprise locating the matching modeling parameter vector based on iterative adjustment of an initial guess. In some embodiments, the activity at block 1181 may comprise locating the matching modeling parameter vector in a look-up table of previously-generated, expected results. In some embodiments, the method 1151 includes an inversion loop that operates to improve matching performance, to include the activities of modeling, transformation, and location of blocks 1173, 1177, and 1185, respectively.

The method 1151 may continue on to conclude at block 1185 with displaying at least a portion of the matching modeling parameter vector to represent at least one property of a geological formation.

It should be noted that the methods described herein do not have to be executed in the order described, or in any particular order. Moreover, various activities described with respect to the methods identified herein can be executed in iterative, serial, or parallel fashion. The various elements of each method (e.g., the methods shown in FIGS. 1, 2, 4 and 11) can be substituted, one for another, within and between methods. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 12:
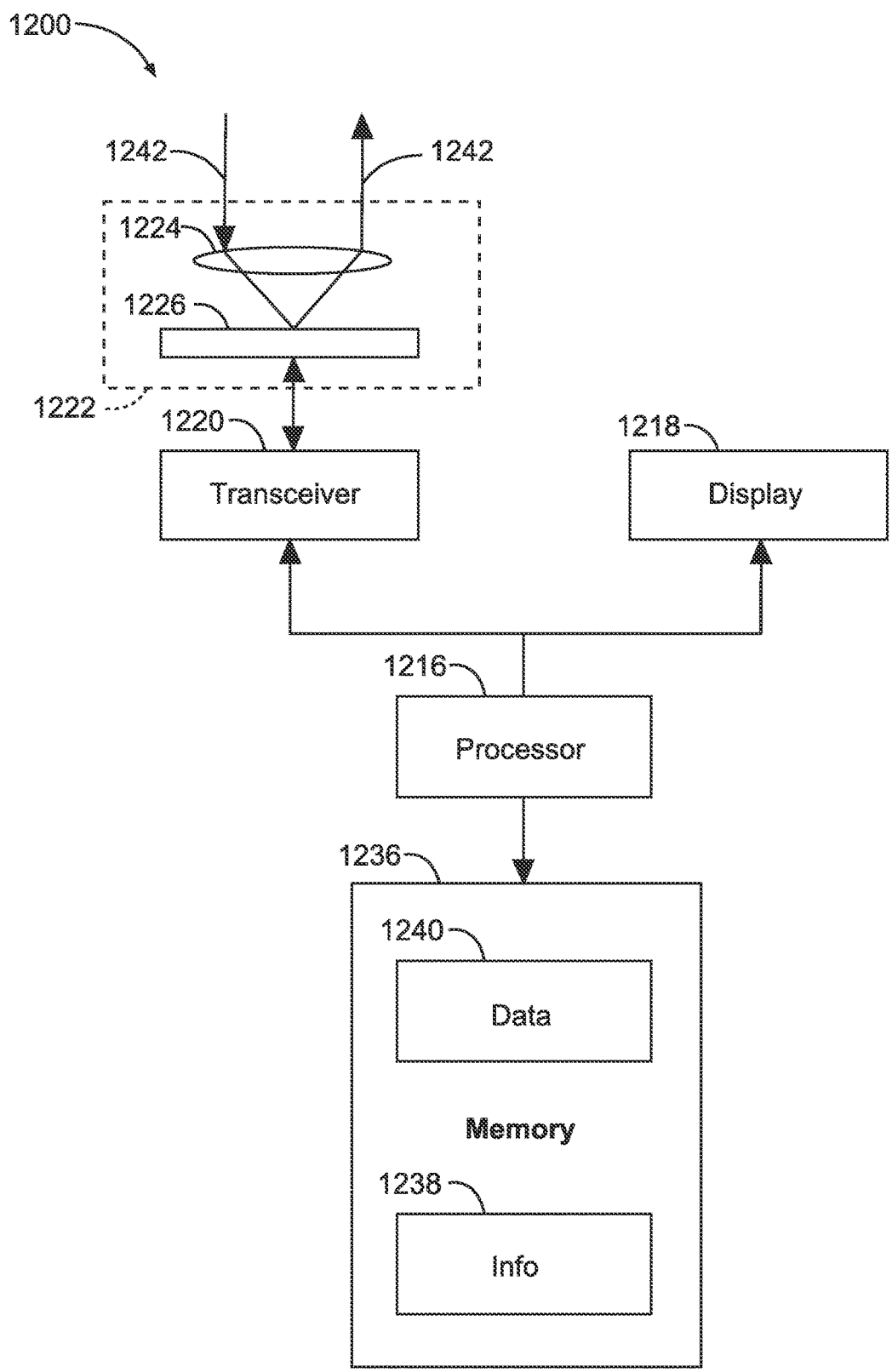
FIG. 12 is a block diagram of an article according to various embodiments of the invention.

For example, FIG. 12 is a block diagram of an article 1200 of manufacture according to various embodiments, such as a computer, a memory system, a magnetic or optical disk, or some other storage device. The article 1200 may include one or more processors 1216 coupled to a machine-accessible medium such as a memory 1236 (e.g., removable storage media, as well as any tangible, non-transitory memory including an electrical, optical, or electromagnetic conductor) having associated information 1238 (e.g., computer program instructions and/or data), which when executed by one or more of the processors 1216, results in a machine (e.g., the article 1200) performing any actions described with respect to the methods of FIGS. 1, 2, 4, and 11, the apparatus and systems of FIG. 8, and the systems of FIGS. 8-10. The processors 1216 may comprise one or more processors sold by Intel Corporation (e.g., Intel® Core™ processor family), Advanced Micro Devices (e.g., AMD Athlon™ processors), and other semiconductor manufacturers.

In some embodiments, the article 1200 may comprise one or more processors 1216 coupled to a display 1218 to display data processed by the processor 1216 and/or a wireless transceiver 1220 (e.g., a down hole telemetry transceiver) to receive and transmit data processed by the processor.

The memory system(s) included in the article 1200 may include memory 1236 comprising volatile memory (e.g., dynamic random access memory) and/or non-volatile memory. The memory 1236 may be used to store data 1240 processed by the processor 1216.

In various embodiments, the article 1200 may comprise communication apparatus 1222, which may in turn include amplifiers 1226 (e.g., preamplifiers or power amplifiers) and one or more antenna 1224 (e.g., transmitting antennas and/or receiving antennas). Signals 1242 received or transmitted by the communication apparatus 1222 may be processed according to the methods described herein.

Many variations of the article 1200 are possible. For example, in various embodiments, the article 1200 may comprise a down hole tool, including the apparatus 800 shown in FIG. 8. In some embodiments, the article 1200 is similar to or identical to the apparatus 800 or system 864 shown in FIG. 8.

In summary, the apparatus, systems, and methods disclosed herein, encourage the efficient computation and application of large databases for environmental effect correction and inversion algorithms, improving the efficiency of profitability of 2D/3D inversion service, increasing the quality of the data acquired with electromagnetic logging tools, and helping to optimize identification and recovery of hydrocarbon reserves.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for reducing sensitivity to borehole effects associated with borehole measurements in a drilled borehole, the system comprising:
   a housing disposed within the borehole drilled in a geological formation;
   at least one down hole sensor attached to the housing, the at least one down hole sensor to provide a measurement based on anisotropic wave propagation in the drilled borehole characterizing the geological formation in the borehole, wherein the downhole sensor comprises a multi-component induction logging tool sensitive to the borehole effects;
   a processor; and
   a machine-readable medium having program code executable by the processor to cause the processor to,
      generate an AF map that transforms accurate modeled measurement results into fast modeled measurement results, wherein the transformation is based on scaling the accurate modeled measurement results to the fast modeled measurement results;
      receive the measurement from the down hole sensor;
      transform the measurement into a fast modeled measurement result using the AF map; and
      transform the fast modeled measurement result into a modeling parameter vector via inversion to correct the transformed measurement for the sensitivity to the borehole effects during the measurement by the sensor, wherein the modeling parameter vector is associated with a value of at least one property of the geological formation.

2. The system of claim 1, wherein the processor is located in a workstation at the surface, and wherein the program code comprises program code executable by the processor to cause the processor to process at least a portion of the modeling parameter vector to represent the value of at least one property of the geological formation on a display.

3. The system of claim 1, wherein the program code comprises program code executable by the processor to cause the processor to,
transform additional measurements obtained from the at least one down hole sensor into the fast modeled measurement results using the AF map, and
transform the fast modeled measurement results into the modeling parameter vector via inversion.

4. One or more non-transitory machine-readable media comprising program code for correcting a measurement based on anisotropic wave propagation in a drilled borehole of a geological formation to reduce sensitivity to borehole effects in the drilled borehole, the program code to:
generate an AF map that transforms accurate modeled measurement results into fast modeled measurement results within a modeled data space, wherein the transformation is based on scaling the accurate modeled measurement results to the fast modeled measurement results;
receive the measurement from a sensor disposed in the borehole drilled in the geological formation, wherein the sensor comprises a multi-component induction logging tool sensitive to the borehole effects;
transform the measurement into a fast modeled measurement result using the AF map;
invert to transform the fast modeled measurement result into a modeling parameter vector to correct the transformed measurement for the sensitivity to the borehole effects during the measurement by the sensor wherein the modeling parameter vector is associated with a value of at least one property of the geological formation; and
display at least a portion of the modeling parameter vector to represent at least one property of the geological formation.

5. The one or more non-transitory machine-readable media of claim 4, wherein the program code to calculate the AF map comprises program code to:
calculate the accurate modeled measurement results; and
calculate the fast modeled measurement results.

6. The one or more non-transitory machine-readable media of claim 4, wherein the program code to calculate the AF map comprises program code to:
select fitting parameters for an analytical function to map the accurate modeled measurement results to the fast modeled measurement results over a grid of modeling parameter vectors including the modeling parameter vector.

7. The one or more non-transitory machine-readable media of claim 6, wherein the program code to transform the actual measurement comprises program code to apply the analytical function to the actual measurement.

8. The one or more non-transitory machine-readable media of claim 4, wherein the program code to invert to transform the fast modeled measurement results comprises program code to:
searching the fast modeled measurement results to provide elements of the modeling parameter vector.

9. The one or more non-transitory machine-readable media of claim 4, wherein the program code comprises program code to:
process the modeling parameter vector to provide an image of the processed values, including formation resistivity, for publication to a display.

10. The one or more non-transitory machine-readable media of claim 4, wherein the program code comprises program code to:
use at least one of an analytical method, a finite difference method, an integral equation method, and a semi-analytical method to calculate the AF map and to invert to transform the fast modeled measurement results.

11. A method for reducing sensitivity to borehole effects associated with borehole measurements in a drilled borehole, the method comprising:
generating an FA map that transforms fast modeled measurement results into accurate modeled measurement results, wherein the transformation is based on scaling the fast modeled measurement results to the accurate modeled measurement results; placing a sensor in the borehole drilled in a geological formation, wherein the sensor comprises a multi-component induction logging tool sensitive to borehole effects;
powering on the sensor;
obtaining from the sensor a measurement based on anisotropic wave propagation in the drilled borehole;
modeling the measurement using a plurality of modeling parameter vectors to generate a fast modeled measurement result;
transforming the fast modeled measurement result into an accurate modeled measurement result by using the FA map to correct the fast modeled measurement result;
locating, in response to said transforming, a matching modeling parameter vector among the plurality of modeling parameter vectors that matches the accurate modeled measurement result to the measurement, wherein the matching modeling parameter vector is indicative of a correction to the accurate modeled measurement result for the sensitivity to the borehole effects during the measurement by the sensor and is associated with a value of at least one property of the geological formation; and
displaying at least a portion of the matching modeling parameter vector to represent at least one property of the geological formation.

12. The method of claim 11, wherein the modeling comprises modeling using at least one of an analytical method, a finite difference method, an integral equation method, and a semi-analytical method.

13. The method of claim 11, wherein modeling parameters used in the modeling comprise at least one of vertical resistivity, horizontal resistivity, anisotropy ratio, relative dip, relative strike, and caliper size.

14. The method of claim 11, wherein calculating the FA map comprises:
selecting an analytical function that includes a set of fitting parameters to map the fast modeled measurement results to the accurate modeled measurement results.

15. The method of claim 11, wherein calculating the FA map comprises:
fitting rapid fit curve points to a final curve defined by accurate fit curve points to produce the FA map, using a polynomial approximation.

16. The method of claim 11, wherein locating the matching modeling parameter vector comprises:
locating the matching modeling parameter vector based on iterative adjustment of an initial guess.

17. The method of claim 11, comprising:
locating the matching modeling parameter vector in a look-up table of previously-generated, expected results.

18. A method for reducing sensitivity to borehole effects associated with borehole measurements in a drilled borehole, the method comprising:
- calculating accurate modeled measurement results;
- calculating fast modeled measurement results;
- generating an AF map that transforms the accurate modeled measurement results into the fast modeled measurement results, wherein the transformation is based on scaling the accurate modeled measurement results to the fast modeled measurement results;
- placing a sensor in the borehole drilled in a geological formation, wherein the downhole sensor comprises a multi-component induction logging tool sensitive to the borehole effects;
- powering on the sensor;
- obtaining from the sensor a measurement based on anisotropic wave propagation in the drilled borehole;
- calculating a transformed measurement result from the measurement using the AF map;
- inverting the transformed measurement result to calculate a modeling parameter vector, wherein the modeling parameter vector is indicative of a correction to the transformed measurement result for the sensitivity to the borehole effects during the measurement by the sensor and is associated with a value of at least one property of the geological formation; and
- displaying at least a portion of the modeling parameter vector to represent the value of the at least one property of the geological formation.

19. The system of claim 1,
- wherein the program code executable by the processor to cause the processor to calculate the AF map comprises program code executable by the processor to cause the processor to calculate the AF map based, at least in part, on a first modeling operation (ALG I) to transform fast modeling parameter vectors into fast modeled measurement results and on a second modeling operation (ALG II) to transform accurate modeling parameters into accurate modeled measurement results, and
- wherein the ALG I is more computationally efficient and less accurate than the ALG II.

20. The one or more non-transitory machine-readable media of claim 4,
- wherein the program code to calculate the AF map comprises program code to calculate the AF map based, at least in part, on a first modeling operation (ALG I) to transform fast modeling parameter vectors into fast modeled measurement results and on a second modeling operation (ALG II) to transform accurate modeling parameters into accurate modeled measurement results, and
- wherein the ALG I is more computationally efficient and less accurate than the ALG II.

21. The method of claim 11,
- wherein calculating the FA map comprises calculating the FA map based, at least in part, on a first modeling operation (ALG I) to transform fast modeling parameter vectors into fast modeled measurement results and on a second modeling operation (ALG II) to transform accurate modeling parameters into accurate modeled measurement results, and
- wherein the ALG I is more computationally efficient and less accurate than the ALG II.

22. The method of claim 18,
- wherein calculating the fast modeled measurement results comprises calculating the fast modeled measurement results based, at least in part, on a first modeling operation (ALG I),
- wherein calculating the accurate modeled measurement results comprises calculating the accurate modeled measurement results based, at least in part, on a second modeling operation (ALG II), and
- wherein the ALG I is more computationally efficient and less accurate than the ALG II.

23. The system of claim 1, wherein the program code executable by the processor to cause the processor to generate the AF map includes program code executable by the processor to cause the processor to:
- determine a measurement range;
- establish a fine parameter grid based, at least in part on the determined measurement range, wherein the fine parameter grid includes measurement values corresponding to a correction modeling parameter;
- establish a coarse parameter grid based, at least in part, on the determined measurement range, wherein the coarse parameter grid includes a subset of the measurement values included in the fine parameter grid;
- process the measurement values in the fine parameter grid using a first measurement correction algorithm to generate a first result curve;
- process the measurement values in the coarse parameter grid using a second measurement correction algorithm to generate a second result curve; and
- curve-fit the first result curve and the second result curve by scaling the values in the first result curve to values in the second result curve.

24. The machine-readable media of claim 4, wherein the program code to generate the AF map includes program code to:
- determine a measurement range;
- establish a fine parameter grid based, at least in part on the determined measurement range, wherein the fine parameter grid includes measurement values corresponding to a correction modeling parameter;
- establish a coarse parameter grid based, at least in part, on the determined measurement range, wherein the coarse parameter grid includes a subset of the measurement values included in the fine parameter grid;
- process the measurement values in the fine parameter grid using a first measurement correction algorithm to generate a first result curve;
- process the measurement values in the coarse parameter grid using a second measurement correction algorithm to generate a second result curve; and
- curve-fit the first result curve and the second result curve by scaling the values in the first result curve to values in the second result curve.

* * * * *